United States Patent [19]
Weeks

[11] Patent Number: 5,957,471
[45] Date of Patent: Sep. 28, 1999

[54] SNOW VEHICLE

[76] Inventor: Bruce V. Weeks, 12998 Worthington Rd. N.W., Pataskala, Ohio 43062

[21] Appl. No.: 08/738,798

[22] Filed: Oct. 28, 1996

[51] Int. Cl.$^6$ .................................................. B62B 13/08
[52] U.S. Cl. .......................... 280/18; 280/21.1; 280/28.16
[58] Field of Search ............................ 280/18, 845, 14.2, 280/28, 28.16, 18.1, 21.1, 28.15; 441/74, 79

[56] References Cited

U.S. PATENT DOCUMENTS

| | | | |
|---|---|---|---|
| 2,139,513 | 12/1938 | Nelson et al. | 280/18 |
| 3,512,195 | 5/1970 | Porsche | 280/18 X |
| 3,579,682 | 5/1971 | Wood | 280/18 X |
| 3,600,000 | 8/1971 | Bergstrom et al. | 280/18 |
| 3,937,482 | 2/1976 | Johnson | 280/18 |
| 4,533,150 | 8/1985 | Hardy | 280/18 |
| 4,561,664 | 12/1985 | Cashmere | 280/18 |

FOREIGN PATENT DOCUMENTS

| | | | |
|---|---|---|---|
| 262072 | 5/1968 | Austria | 280/18 |
| 656009 | 3/1965 | Belgium | 280/18 |
| 2435956 | 5/1980 | France | 280/18 |
| 2532034 | 2/1977 | Germany | 280/18 |
| 8800968 | 11/1989 | Netherlands | 280/18 |
| 668949 | 2/1989 | Switzerland | 280/18 |

Primary Examiner—J. J. Swann
Assistant Examiner—Michael Mar
Attorney, Agent, or Firm—Thomas S. Baker, Jr.

[57] ABSTRACT

A snow vehicle has a hull with a plurality of longitudinally extending bottom sliding surfaces adapted to independently contact the ground and each incorporating a control element to cause the vehicle to be steered as it is rotated about a longitudinal axis. The snow vehicle has an operator platform hull which will accommodate an operator seated on the snow vehicle when the snow vehicle is utilized as a sled and which will accommodate the feet of a rider when the snow vehicle is operated as a snow board.

5 Claims, 7 Drawing Sheets

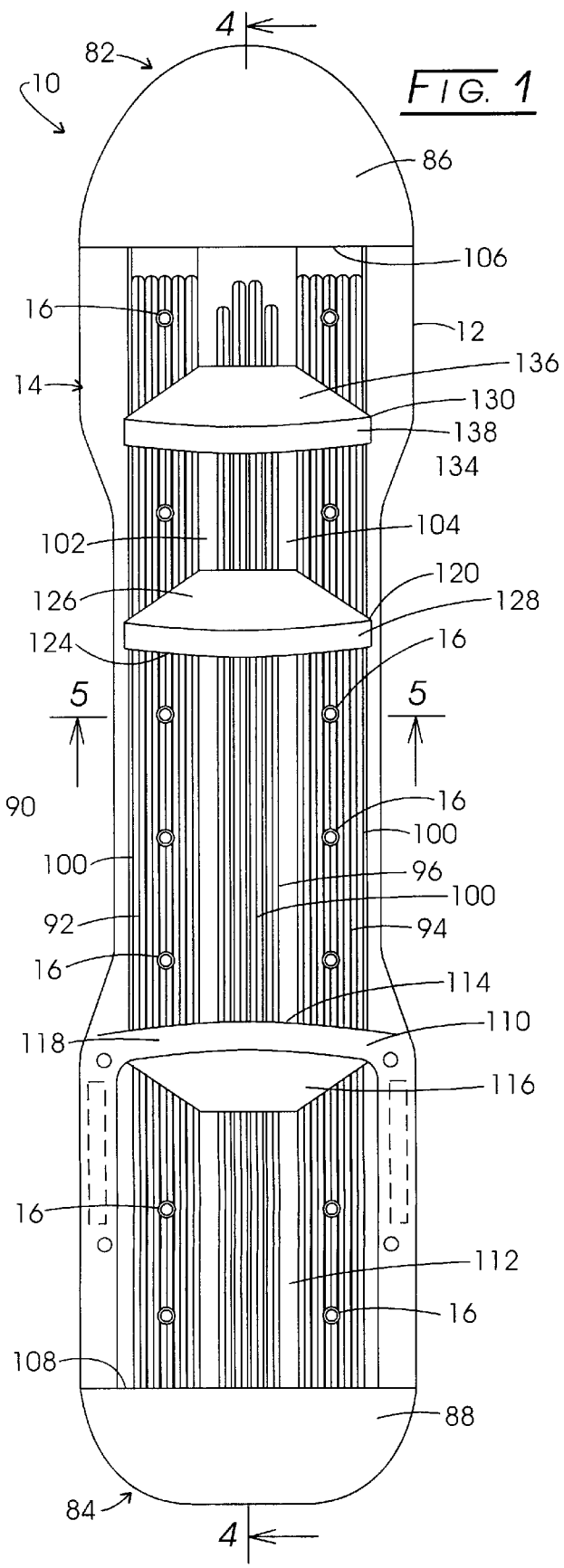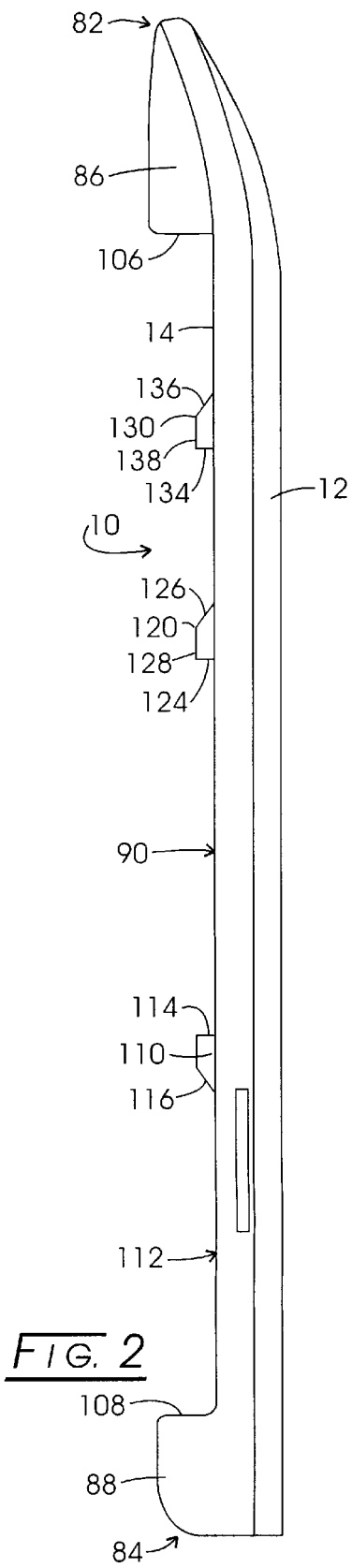

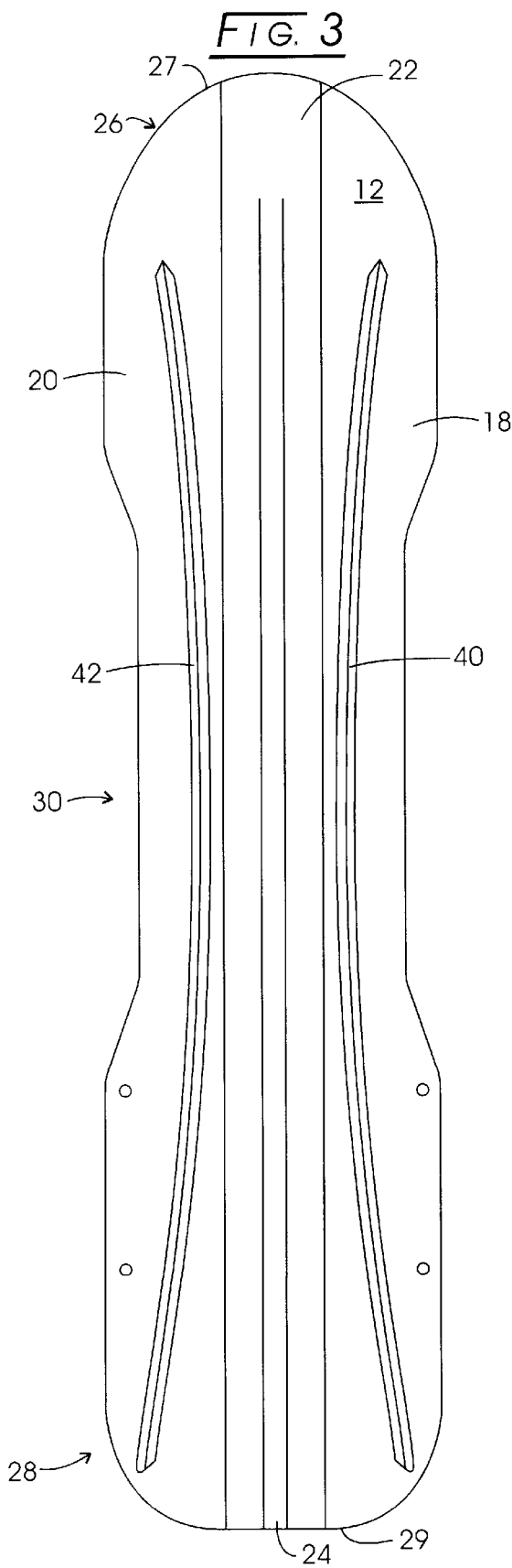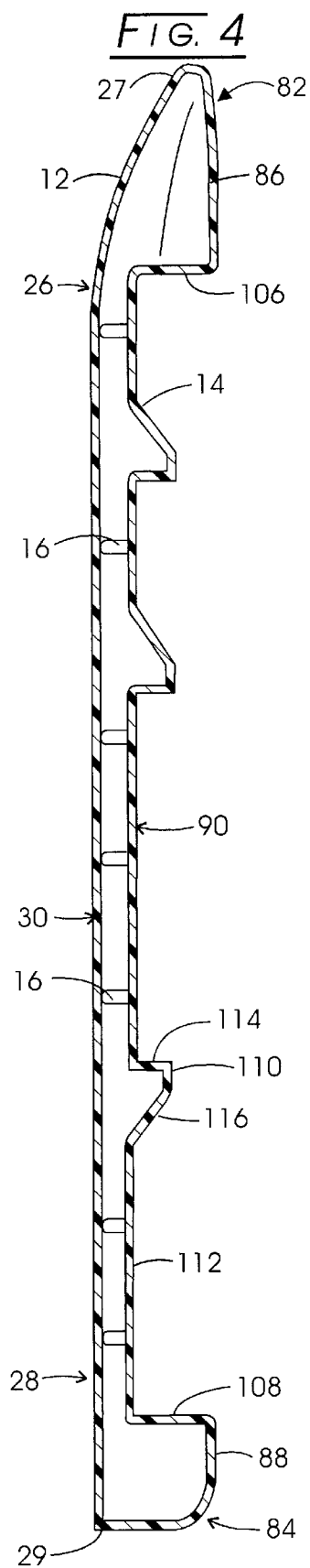

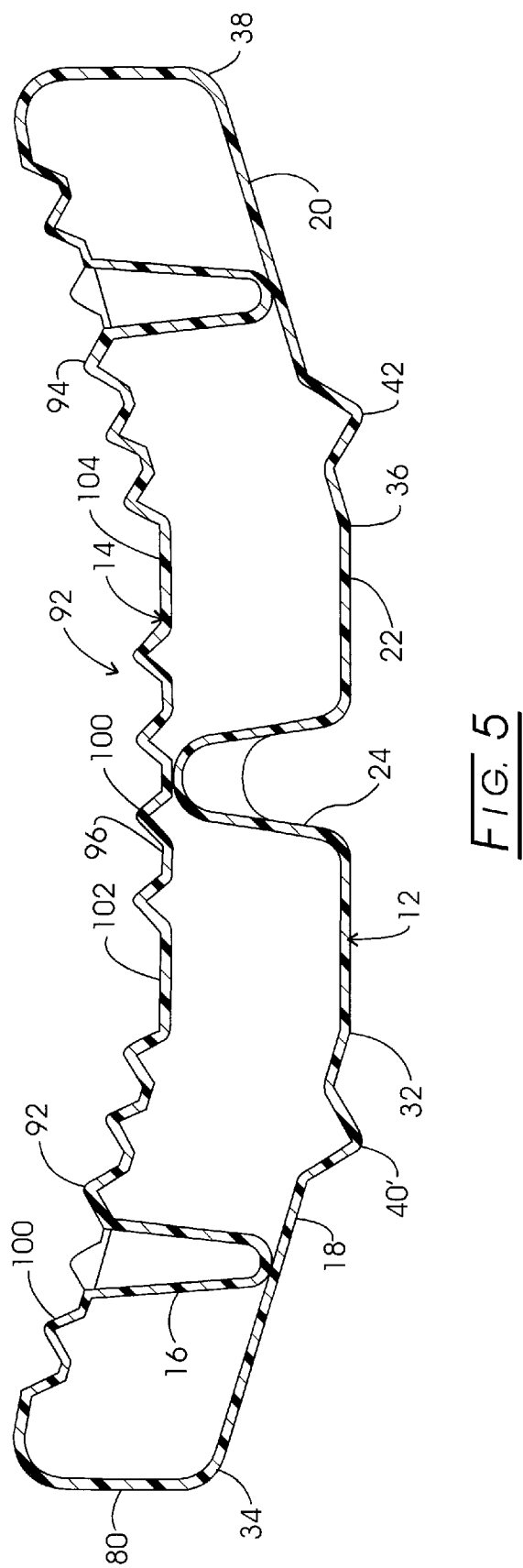

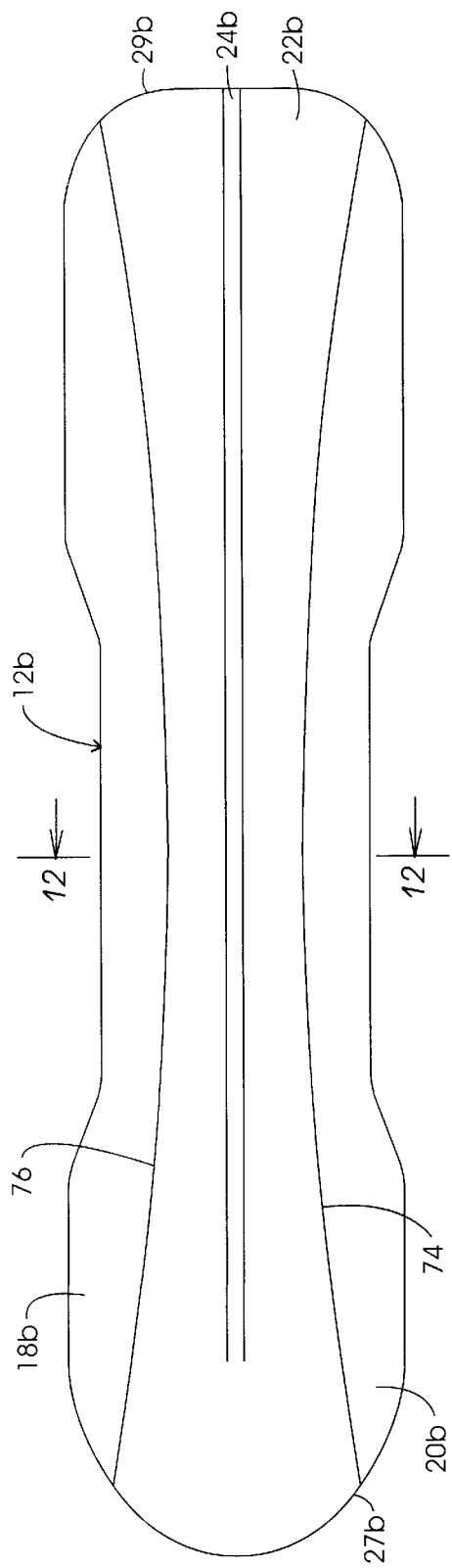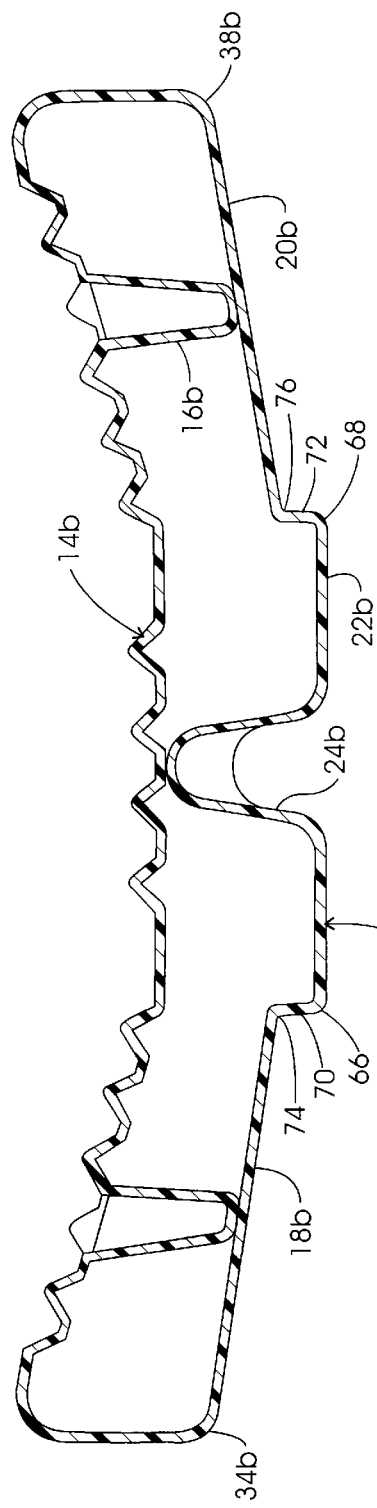

SNOW VEHICLE

BACKGROUND OF THE INVENTION

This invention relates to a snow vehicle adapted to be steered by rotating the hull about a longitudinal axis. The vehicle may be ridden as a sled by a seated rider or as a snow board with the rider standing on the top deck thereof.

Traditionally recreational toy sleds for children had a pair of metal snow engaging runners which extended from beneath a planar top deck adapted to receive a rider who sat or laid thereon. Oftentimes such a sled had a steering mechanism which incorporated a linkage attached to the front portions of the runners and operated by twisting or bending the front portions of the runners in a desired direction of travel.

Recently sleds have been constructed as unitary plastic molded structures which frequently lack a traditional steering mechanism. Such structures are advantageous in that they are relatively inexpensive, lightweight and durable. Additionally, they were not subject to rusting and loosening of fasteners which frequently occurred with the traditional sleds.

More recently, snow boards have become popular snow vehicles. Typically snow boards have a planar bottom snow engaging surface and a relatively flat top surface, which a rider stands upon, adapted to receive a set of boot bindings. A rider rides a snow board by inserting his boots in the bindings for attachment thereto and thereafter maneuvers the board with a combination of kneeling and standing movements and shifting of bodyweight. Snow boards may be constructed of plastic, wood, laminated wood or some combination thereof.

Snow boarding has become a popular winter sport throughout the world. One problem with snow boarding resides in the fact that snow boards are relatively expensive and a rider also must have bindings and boots which likewise are expensive. Consequently, a rider or operator wanting to move from a sled to a snow board must incur a significant expense.

Thus, it becomes desirable to provide a low-cost snow vehicle for beginning riders desiring to make a transition from a sled to a snow board. The snow vehicle of Applicant's invention meets this need. Applicant's snow vehicle which is a unitary molded product has been designed as both a sled and an introductory snow board. The vehicle may be ridden by a rider seated on a top deck surface with his legs projecting forwardly in the style of a traditional sled or by a rider standing on the top deck surface and maneuvering the vehicle by changing positions and shifting his weight in the manner of a snow board. An additional advantage to Applicant's snow vehicle resides in the fact that it has been designed to accommodate the feet of an operator standing on the top deck without the need for bindings or special boots. Additionally, Applicant's snow vehicle incorporates a unique steering mechanism having no moving parts and a number of significant safety related features.

For safety, Applicant's snow vehicle is relatively lightweight and has resilient nose and tail members adapted to deflect inwardly upon impact to absorb forces which otherwise may have to be absorbed by an operator. Additionally, Applicant's snow vehicle has built-in foot engaging surfaces on the top deck thereof adapted to ensure that an operator's foot does not become lodged to the top deck should the operator fall or otherwise become disassociated with the vehicle.

These and other features of Applicant's snow vehicle will be discussed in detail hereinbelow.

SUMMARY OF THE INVENTION

A snow vehicle has a hull element adapted to engage and slide on the ground. The hull element defines a pair of longitudinally extending bottom side sliding surface elements adapted to independently contact the ground and a longitudinally extending bottom central sliding surface element interposed therebetween. The central sliding surface element is joined to each of the bottom side sliding surface elements such that each of these elements extends at an angle from the bottom central sliding surface.

DESCRIPTION OF THE DRAWINGS

FIG. 1 is a plan view of the snow vehicle of the instant invention;

FIG. 2 is a side view of the vehicle of FIG. 1;

FIG. 3 is a bottom view of Applicant's snow vehicle;

FIG. 4 is a longitudinal sectional view along line 4—4 of FIG. 1;

FIG. 5 is a cross-sectional view along line 5—5 of FIG. 1;

FIG. 11 is a bottom view similar to FIG. 3 of a still another embodiment of a hull adapted to be used with Applicant's snow vehicle; and FIG. 12 is a view along line 12—12 of FIG. 11.

DESCRIPTION OF THE PREFERRED EMBODIMENT

Figure 6:
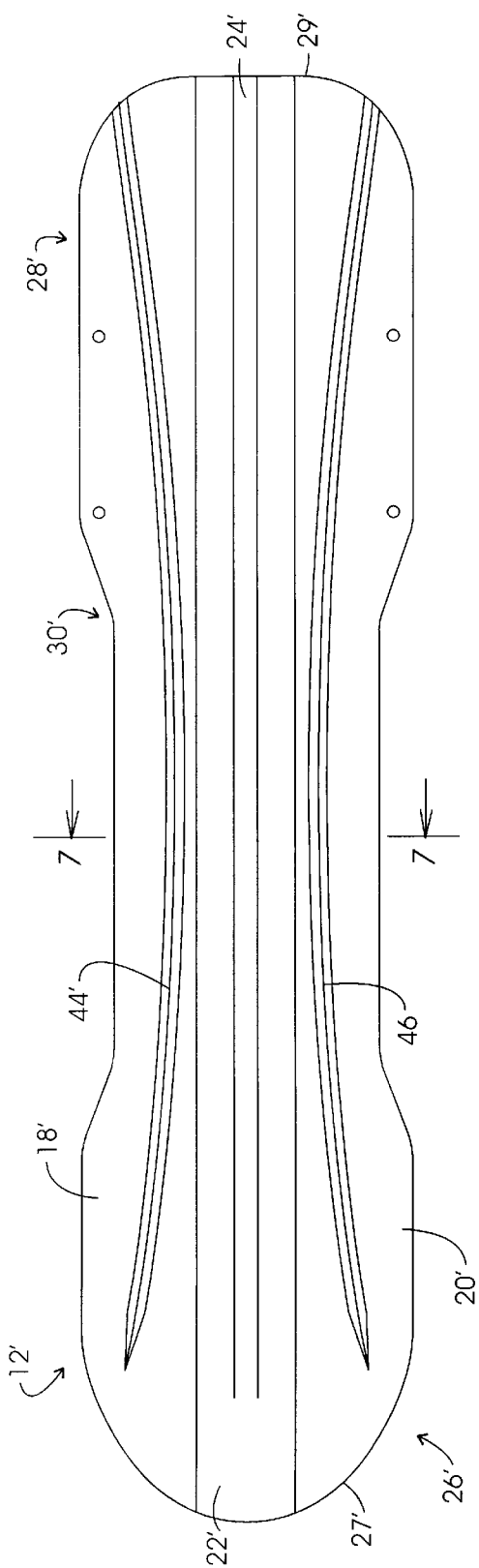
FIG. 6 is a view similar to FIG. 3 showing an alternate embodiment of the directional control elements used in conjunction with the snow vehicle of the instant invention.

Turning to FIGS. 1 through 4, it may be observed that the snow vehicle 10 of the instant invention is formed as a unitary structure. It has been found preferable to manufacture vehicle 10 as a one piece blow molded article. Snow vehicle 10 generally is formed with a hull 12 joined to a top deck 14. A plurality of cones 16 are molded into the structure of vehicle 10 at critical high stress locations to maintain the space between hull 12 and deck 14 as may be seen by referring to FIGS. 4 and 5.

Hull 12 may be seen in detail by referring to FIGS. 3 and 5. Hull 12 has a bottom surface defined by a pair of longitudinally extending bottom side sliding surfaces 18 and 20 separated by and connected to a bottom central sliding surface 22. A longitudinally extending concave riblet 24 is formed in the middle of bottom central sliding surface 22 to improve directional stability of vehicle 10. Although depicted as an upwardly extending concave member, riblet 24 also may be constructed as a downwardly extending convex member.

From FIG. 3 it may be seen that the bottom side sliding surfaces 18 and 20 and bottom central sliding surface 22 define a front end surface 26 having a leading edge 27 and a rear end surface 28 having a trailing edge 29 with the front and rear end surfaces 26 and 28 joined by a central surface 30 therebetween. The front and rear end surfaces 26 and 28 extend laterally a greater distance than central surface 30 such that the bottom surface of hull 12 generally defines an hourglass shape. Such a shape provides important advantages for snow vehicle 10. By making the front end surface 26 relatively wide, the leading edge 27 of the vehicle tends to float on top of the snow as opposed to having a tendency to dig or dive into the snow. By making the rear end surface 28 relatively wide compared to the rest of the vehicle, a greater seating area on the top deck as described hereinbelow is provided for a rider to ensure them that the rider and his clothing are fully contained within the vehicle and do not slide on the ground.

Referring again to FIG. 5, it may be observed that the bottom side sliding surface 18 has a pair of longitudinally extending edges 32 and 34 and that bottom side sliding surface 20 has a pair of longitudinally extending edges 36 and 38. Edge 32 of side sliding surface 18 is joined at an obtuse angle to one side of central sliding surface 22 whereas edge 36 of bottom side sliding surface 20 is joined at an obtuse angle to the opposite side of bottom central sliding surface 22. Consequently, each of the bottom side sliding surfaces 18 and 20 extend upwardly and outwardly at an angle from the bottom central sliding surface 22. With this construction each of the planar bottom side sliding surfaces 18 and 20 and the planar bottom central sliding surface 22 may contact the ground substantially independently of the others. In other words, a rider may rotate vehicle 10 about its longitudinal axis A—A to alternatively cause bottom side sliding surface 18 to contact the ground substantially independently of the bottom sliding surfaces 20 and 22, to cause bottom side sliding surface 20 to contact the ground substantially independently of sliding surface 18 and 22, or to cause bottom central sliding surface 22 to contact the ground substantially independently of the side sliding surfaces 18 and 20. When bottom central sliding surface 22 engages the ground, concave riblet 24 functions to ensure that land vehicle 10 travels in a straight line. From FIG. 3, it may be observed that the rear end of riblet 24 passes through the trailing edge 29 of hull 12 to ensure that snow does not build up in the riblet and interfere with its directional stabilizing function.

Turning again to FIGS. 3 and 5, it may be seen that a pair of downwardly extending or convex control elements 40 and 42 are formed in the bottom side sliding surfaces 18 and 20 respectively. Control elements 40 and 42 have a generally arcuate shape and extend longitudinally substantially the entire length of the respective sliding surfaces 18 and 20. The control elements 40 and 42 function to impart a steering capability to the snow vehicle 10. When snow vehicle 10 is rotated about its longitudinal axis A—A such that bottom side sliding surface 18 contacts the snow, control element 40 causes the vehicle to turn in one direction. When snow vehicle 10 is rotated about its longitudinal axis such that bottom side sliding surface 20 engages the snow, control element 42 causes vehicle 10 to turn in the opposite direction. As mentioned previously, when snow vehicle 10 has not been rotated about its longitudinal axis A—A and bottom central sliding surface 20 contacts the snow, vehicle 10 travels in a straight line.

Figure 7:
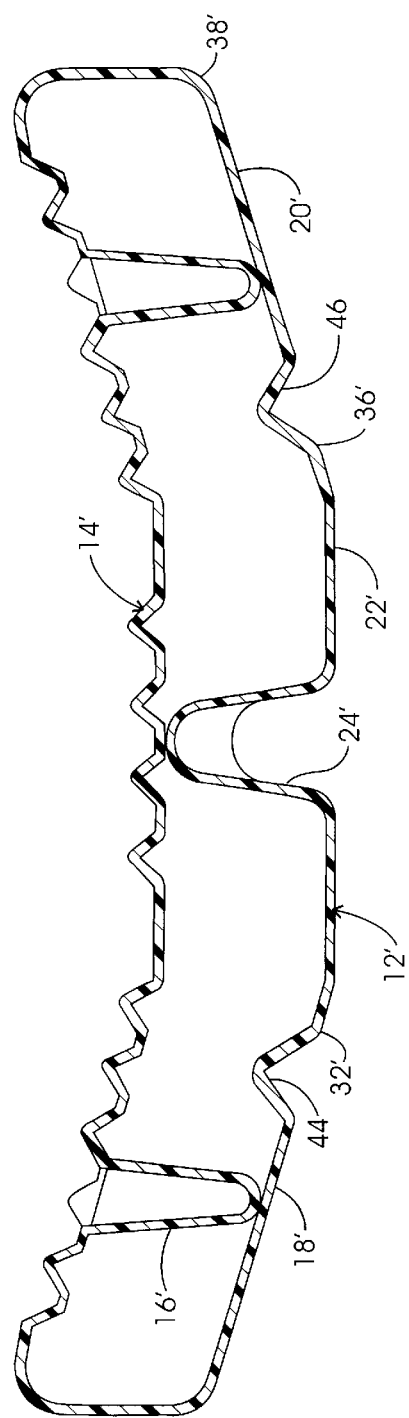
FIG. 7 is a view along line 7—7 of FIG. 6.

An alternate embodiment of control elements for hull 12 may be seen by referring to FIGS. 6 and 7 where elements identical to those disclosed in FIGS. 3 and 5 are indicated by identical primed numerals.

Turning to FIG. 6, it may be seen that longitudinally extending control elements 44 and 46 are formed in bottom side sliding surfaces 18' and 20' respectively. The control elements 44 and 46 are generally arcuate in shape and extend substantially the entire length of the side sliding surfaces 18' and 20'. The control elements 44 and 46 are inwardly extending or concave in shape as opposed to the convex or downwardly extending control elements 40 and 42 depicted in the embodiment of FIG. 3. Additionally, the control elements 44 and 46 extend through the trailing edge 29' of rear end surface 28' of hull 12'. The control elements 44 and 46 function in the same manner as the control elements 40 and 42. When snow vehicle 10 is rotated such that bottom side sliding surface 18' engages the snow, control element 44 causes the vehicle to turn in one direction. When vehicle 10 is rotated about it longitudinal axis A—A such that bottom side sliding surface 20 contacts the snow, control element 46' causes the vehicle to turn in the opposite direction.

It has been found that an operator can control the degree of angularity in a turn by shifting his weight such that more or less weight is applied to the front, center or rear of the control elements 40 through 46. Additionally, it has been found that the longitudinal edges 32' and 36' at the juncture of bottom central sliding element 22 and bottom side sliding surfaces 18 and 20 respectively also function to impart directional stability to snow vehicle 10.

Figure 8:
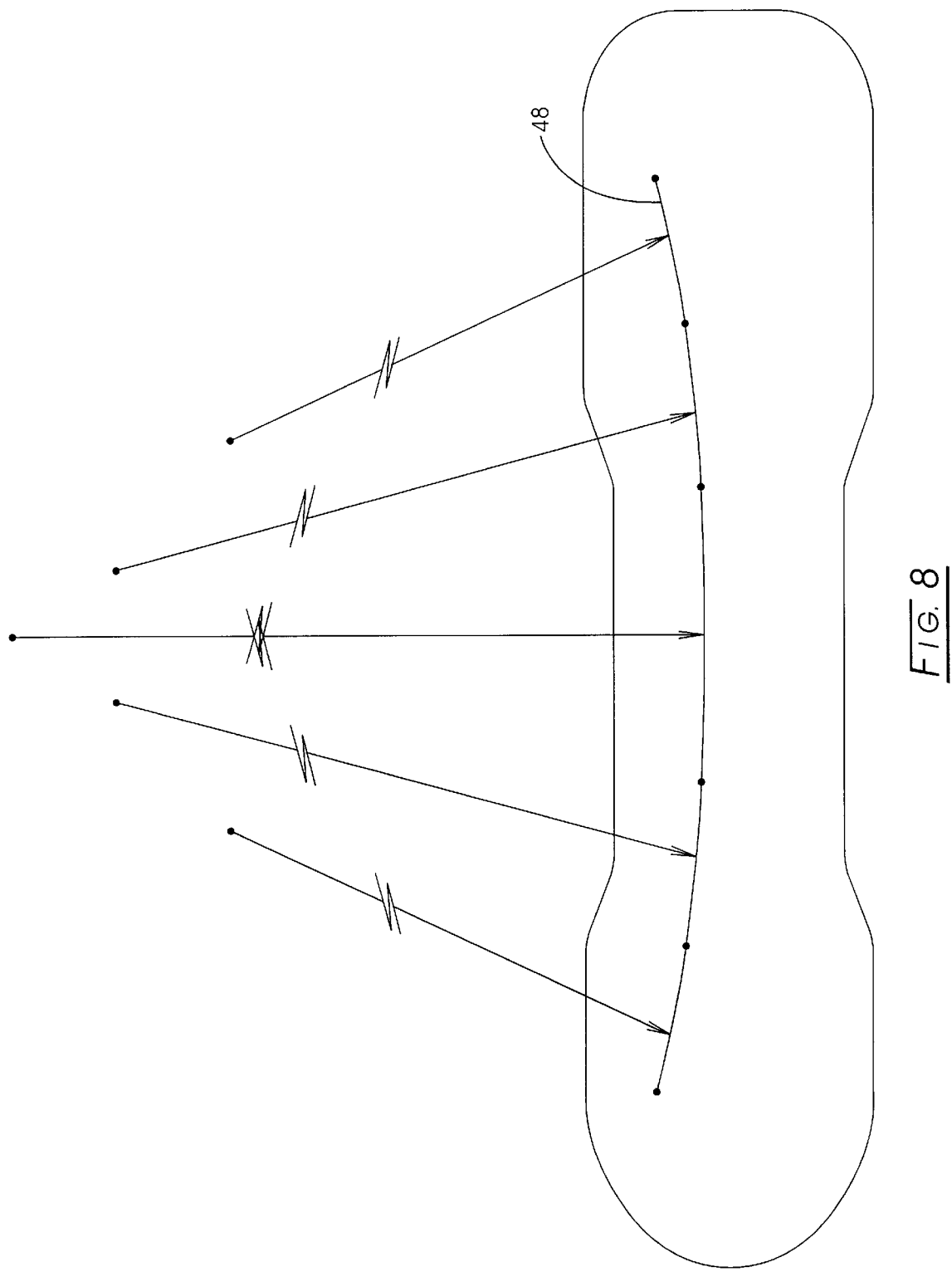
FIG. 8 is a view illustrating an alternative embodiment for a directional control element adapted to be used in the snow vehicle of the instant invention.

Each of the aforementioned arcuate control elements 40 through 46 may be formed in the manner of control element 48 depicted graphically in FIG. 8. Control element 48 may be formed from a plurality of arcs having the same or different radii. The choice of radius for each of the arcs is dependent upon the degree of curvature desired for control element 48 which in turn depends upon the turning radius to be imparted to snow vehicle 10. An arc having a shorter radius will impart a greater curve to the control element 48.

Figure 9:
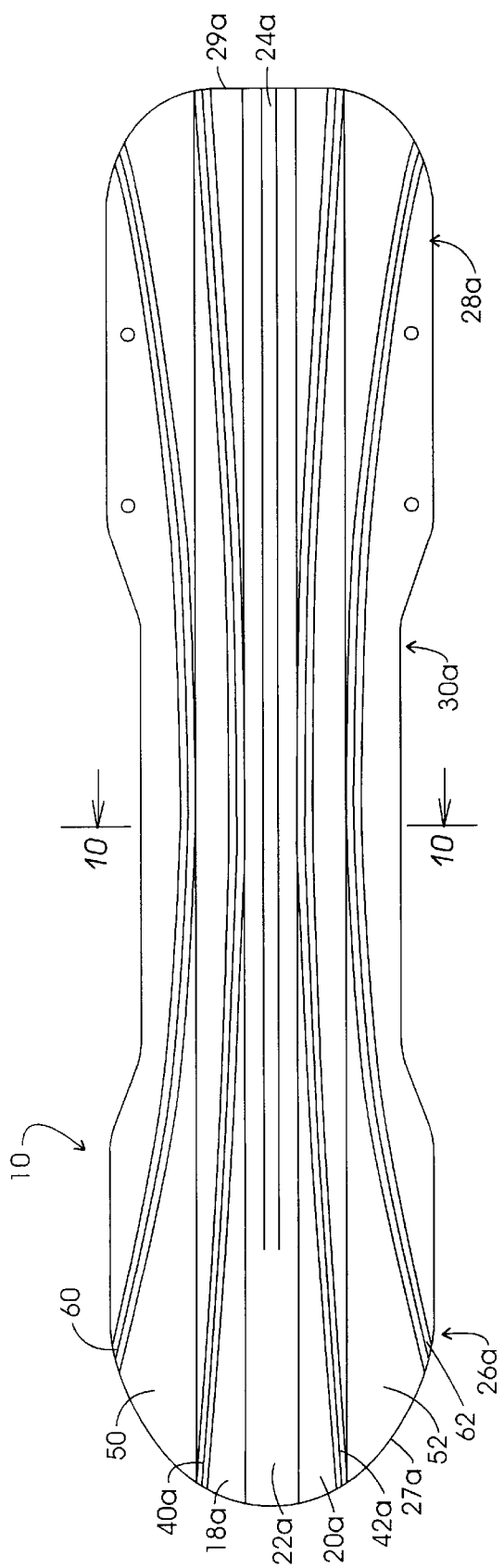
FIG. 9 is a bottom view similar to FIG. 3 illustrating an alternative hull for Applicant's snow vehicle.
Figure 10:
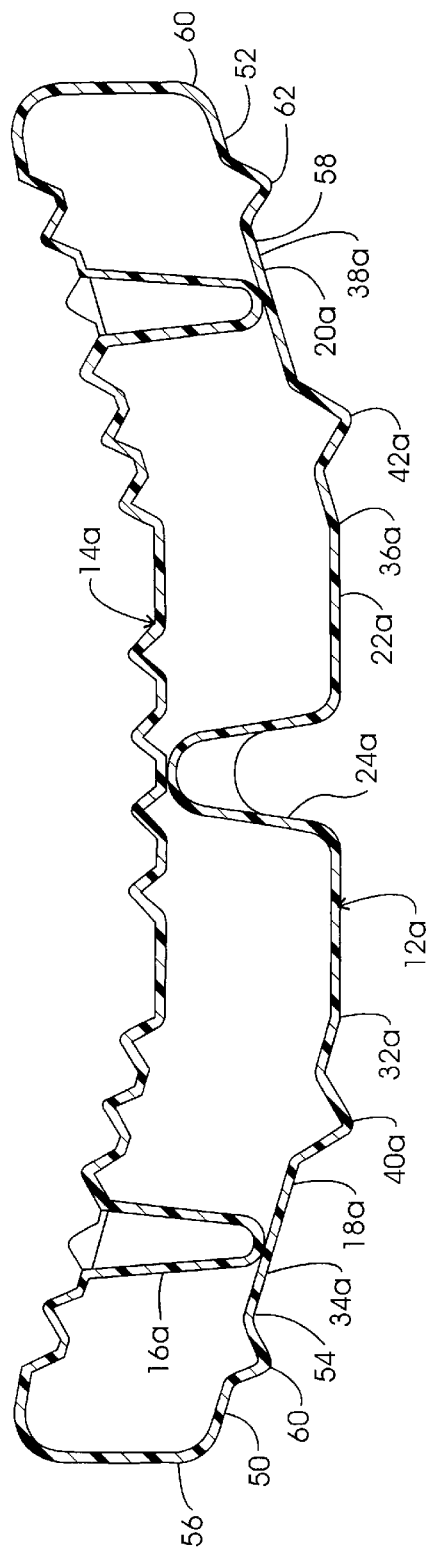
FIG. 10 is a view along line 10—10 of FIG. 9.

Each of the hulls depicted in the preferred embodiment set forth in FIGS. 1 through 7 had three bottom sliding surfaces. These included a pair of side sliding surfaces 18 and 20 joined to a central sliding surface 22. Another embodiment of hull 12 may be seen by referring to FIGS. 9 and 10 where elements identical to those of the preferred embodiment are indicated by identical numbers with an "a" suffix. Hull 12a differs from hull 12 of the preferred embodiment in that in addition to the bottom side sliding surfaces 18a and 20a it also incorporates an additional pair of bottom outer side sliding surfaces 50 and 52. Bottom outer side sliding surface 50 has a pair of longitudinally extending edges 54 and 56 and bottom outer side sliding surface 52 has a pair of longitudinally extending edges 58 and 60. Edge 54 of bottom outer side sliding surface 50 joins edge 34a of bottom side sliding surface 18a at an obtuse angle such that outer side sliding surface 50 extends upwardly and outwardly with respect to bottom side sliding surface 18a. Similarly, edge 58 of bottom outer side sliding surface 52 joins edge 38a of bottom side sliding surface 20a at an obtuse angle such that outer side sliding surface 52 extends upwardly and outwardly with respect to bottom side sliding surface 20a. Thus it may be seen that the embodiment of hull 12a depicted in FIGS. 9 and 10 provides five separate planar sliding surfaces 18a, 20a and 22a and 50 and 52 adapted to contact snow as snow vehicle 10 rotates about its longitudinal axis A—A.

Additionally, longitudinally extending arcuate control surfaces 60 and 62 are formed in the outer side sliding surfaces 50 and 52 respectively. From FIG. 9 it may be seen that the control surfaces 60 and 62 are formed from an arc having a smaller radius than that of the arcuate control surfaces 40a and 42a. Consequently, when hull 12a has rotated about its longitudinal axis A—A such that one of the bottom outer side sliding surfaces 50 and 52 contacts the snow its respective control surface 60 and 62 will cause snow vehicle 10 to turn a sharper curve than where the sled is rotated such that one of the side sliding surfaces 18a and 20a engages the snow and its respective control element 40a and 42a engages the snow.

From the above it may be seen that snow vehicle 10 of the instant invention may be incrementally rotated about its longitudinal axis A—A to cause the vehicle 10 to turn in arcs formed from different radii to control the sharpness of turns made by the vehicle.

A further hull embodiment of the instant invention may be seen by referring to FIGS. 11 and 12. Elements identical to those of the preferred embodiment set forth in FIGS. 1 through 7 will be identified by identical numbers with a "b" suffix. It may be observed that hull 12b generally defines a pair of bottom side sliding surfaces 18b and 20b joined to a bottom central sliding surface 22b. Bottom central sliding surface 12b is defined partially by a pair of longitudinally extending edges 66 and 68. Edges 66 and 68 extend the length of hull 12b and are arcuate in shape. A vertical wall 70 extends upwardly from edge 66 and a vertical wall 72 extends upwardly from edge 68. The top edge of wall 70 is defined by an edge 74 which is aligned parallel with edge 66 and the top edge of wall 72 as defined by an edge 76 which is aligned parallel with edge 68. Bottom side sliding surface 18b is joined to the top edge 74 of wall 70 and extends upwardly and outwardly therefrom whereas bottom side sliding surface 20b is joined to the top edge 76 of vertical wall 72 and extends upwardly and outwardly therefrom. When vehicle 10 is rotated about its longitudinal axis A—A such that one of the bottom sides sliding surfaces 18b and 20b engages the snow the adjacent edge 66 and 68 of bottom central sliding surface 22b acts as a control surface to cause the vehicle to turn in one direction or the other.

Turning to FIG. 5, it may be observed that a vertical wall 80 extends longitudinally a major portion of the length of snow vehicle 10 and extends between hull 12 and top deck 14 to elevate the top deck above the hull bottom side sliding surfaces 18 and 20 and the bottom central sliding surface 22.

Turning to FIGS. 1, 2 and 4, it may be seen that top deck element 14 has a front end 82 and a rear end 84. Additionally, a nose surface 86 is defined at the front end 82 of snow vehicle 10 and a tail surface 88 is defined at the rear end 84 of top deck 14. The nose and tail surfaces 86 and 88 generally are raised, upwardly projecting, convex, resilient surfaces. From FIG. 4 it may be observed that no support cones 16 are placed in the snow vehicle structure to rigidly separate the nose and tail surfaces 86 and 88 from hull 12. The cones 16 are omitted to allow the nose and tail surfaces 86 and 88 to deflect inwardly on impact when these surfaces strike an object. In the event a rider falls or otherwise becomes separated from the snow vehicle 10 and the vehicle strikes the rider he would be most likely to be struck by the nose or tail surfaces 86 and 88. By allowing these surfaces to deflect inwardly upon impact the nose and tail surfaces 86 and 88 absorb forces which otherwise would have to be absorbed by the rider or an object struck by the snow vehicle 10. The resilient inwardly deflecting nose and tail surfaces 86 and 88 provide an important safety feature for the snow vehicle 10.

Turning again to FIGS. 1, 2, 4 and 5, it may be observed that an operator platform 90 is formed in top deck 14 between the front and rear ends 82 and 84 thereof. In fact, operator platform 90 lies between the nose and tail surfaces 86 and 88.

Operator platform 90 is defined in part by a longitudinally extending planar top central surface 96 and a pair of longitudinally extending planar top side surfaces 92 and 94 each joined to the top central surface 96 at an obtuse angle. With this configuration the top side surfaces 92 and 94 extend upwardly and outwardly from the top central surface 96 such that the top central surface 96 is somewhat below the top side surfaces 92 and 94. This configuration helps a rider to remain standing on the snow vehicle 10 as will be described hereinbelow.

A plurality of longitudinally extending, upwardly directed cleats 100 extend from the top side surfaces 92 and 94 and from top central surface 96 to provide a non-slip surface for a rider standing on the vehicle. In FIGS. 1 and 5 it may be seen that while longitudinally extending cleats 100 extend along the middle of the top central surface 96 of operator platform 90, top central surface 96 has a pair of longitudinally extending planar surfaces 102 and 104 which extend parallel to each other on either side of cleated surface 100 substantially the entire length of operator platform 90. The longitudinally extending planar surfaces 102 and 104 lie below the upper portions of cleats 100 to provide somewhat protected planar surface areas. Surfaces 102 and 104 provide areas to which decorative decals may be applied and which will be protected from scraping and wear caused by rider's boots and shoes.

It may be seen that the ends of operator platform 90 are defined by a lateral wall 106 adjacent nose surface 86 and a lateral wall 108 adjacent tail surface 88. Another lateral wall 110 is formed on operator platform 90 towards the rear of snow vehicle 10 between walls 106 and 108. Wall 110 cooperates with lateral wall 108 adjacent tail surface 88 to define an operator seat area 112. It should be noted that operator seat area 112 is supported on the rear end surface 28 of hull 12. It may be recalled that rear end surface 28 extends laterally a somewhat greater distance than the central hull surface 30 to provide a rider seat area 112 having an increased width. This ensures that a rider's body and clothing will reside fully within the snow vehicle 10 when the rider is seated in the vehicle 10 and riding it as a sled. It may be seen that lateral wall 110 is defined by a curved front foot engaging surface 114 and an inclined planar rear surface 116 both of which extend upwardly from the longitudinally extending top side surfaces 92 and 94 and top central surface 96. Wall 110 also has a planar top surface 118. Planar rear surface 116 has been inclined away from the operator seat area 112 to allow a rider's body to smoothly slide over lateral wall 110 should snow vehicle 10 come to a sudden stop or should the rider become separated from the vehicle for any other reason.

A foot positioning rib 120 is formed in operator platform 90 between lateral wall 110 and wall 106 at the front of snow vehicle 10. Foot positioning wall 120 is defined on one side by a curved foot engaging surface 124 which faces operator seat area 112 and an oppositely facing, inclined planar surface 126 both of which extend upwardly from top side surfaces 92 and 94 and top central surface 96 of operator platform 90 and by a planar top surface 128. Foot positioning rib 120 is located above the central surface 30 of hull 12.

A second foot position rib 130 is formed in operator platform 90 between foot positioning rib 120 and lateral wall 106. Foot positioning rib 130 is defined by a curved foot engaging surface 134 which faces seat area 112 and an inclined planar surface 136 both of which extend upwardly from the top side surfaces 92 and 94 and top central surface 96 of platform 90. A planar top surface 138 defines the top of foot positioning rib 130. It may be observed that rib 130 is positioned above the front end surface 126 of hull 12 where the hull has an increased lateral extent to prevent the leading edge 27 of snow vehicle 10 from angling downwardly into the snow.

As mentioned previously, the foot engaging surfaces 124 and 134 of foot positioning ribs 120 and 130 face the rider seat area 112. Thus, a rider seated in area 112 may selectively place his feet against the rib foot engaging surface 124 and 134 which best accommodates his size.

Although snow vehicle 10 may be ridden by an operator seated in area 112, snow vehicle 10 also may be ridden as a snow board by a rider standing, kneeling or crouching on top deck surface 90. To accomplish this a rider faces one of the sides of snow vehicle 10 and places the outer side of one of his shoes or boots against curved front surface 114 of wall 110 and the outer side surface of his other shoe or boot against one of the curved engaging surfaces 124 and 134 of foot positioning ribs 120 and 130 depending his height or size. Obviously, a taller person will want to move his legs further apart than a shorter person. In this position the rider is facing laterally with respect to the snow vehicle 10 axis A—A as is customary when riding a snow board.

As stated above, snow vehicle 10 may be ridden by a rider in snow board fashion without bindings which act to secure a rider's boots to the vehicle. Also, as mentioned previously, the top side surfaces 92 and 94 of operator platform 90 extend upwardly and outwardly with respect to the top central surface 90 as best seen by referring to FIG. 5. With such an angled operator platform 90, an operator's foot naturally tends to be pushed downwardly towards the top central surface 96 of operator platform 90 and to wedge between the top side surfaces 92 and 94 to thereby provide a relatively secure engagement of the operator's foot with the snow vehicle 10. This position also facilitates the ability of an operator to rock the vehicle about the longitudinal axis A—A to cause it to turn. The cleats 100 provide a non-skid surface for the operator's boots or shoes. Thus, the operator platform 90 configuration acts to assist an operator in keeping his feet anchored to the snow vehicle 10. Further the curved foot engaging surfaces 124 and 134 of ribs 120 and 130 act to provide a smooth surface to enable an operator's shoes or boots to easily disengage operator platform 90 should this become necessary. In other words, the curved foot engaging surfaces 124 and 134 are designed such that an operator's foot is not trapped on operator platform 90. This provides an additional safety feature for snow vehicle 10.

A rider seated in seat area 112 or a rider standing on operator platform 90 may steer snow vehicle 10 by merely shifting his weight to one side or the other to cause the snow vehicle 10 to rotate about its longitudinal axis A—A. When the snow vehicle 10 is rotated about its longitudinal axis A—A, the hull bottom central sliding surface 22 is lifted from the snow to cause one of the bottom side sliding surfaces 20, 22, 50, 52 to engage the snow. When this occurs the snow vehicle is steered in one direction or the other by the control elements 24, 32, 36, 40, 42, 44, 46, 60, 62, 66 and 68. Although steering of snow vehicle 10 has been described in conjunction with the three area hull design depicted in FIGS. 1 through 5, similar steering occurs in connection with the hull embodiment of FIGS. 6 and 7, the hull embodiment of FIGS. 9 and 10 and the hull embodiment of FIGS. 11 and 12. As mentioned above, in the hull embodiment depicted in FIGS. 9 and 10 there are five incremental sliding surfaces and control elements which cause the steering of snow vehicle 10.

Since certain changes may be made in the above-described system and apparatus not departing from the scope of the invention herein and above, it is intended that all matter contained in the description or shown in the accompanying drawings shall be interpreted as illustrative and not in a limiting sense.

I claim as my invention:

1. A snow vehicle which comprises:

a hull element (12) adapted to engage a ground surface, said hull element having a central longitudinally extending concave rib portion formed therein;

a transversely dished top deck element (14) positioned above said hull element and having a rear end surface (88) and a front end surface (86), said top deck element being vertically spaced from a bottom wall of said hull element to form an interior chamber, a plurality of inverted cone-shaped members formed along lateral portions of the bottom surface of said top deck element and extending downwardly therefrom, at least a portion of an uppermost surface of said concave rib portion being in engagement with the bottom surface of said top deck element, and lowermost surfaces of said cone-shaped members being in engagement with the bottom wall of said hull element for maintaining a vertical spacing between said top deck element and said bottom wall of said hull element; and a first laterally extending wall member (110) which is positioned intermediate said rear end surface and said front end surface (88, 86) and which co-operates with said rear end surface (88) to define an operator seat area, said first laterally extending wall member having a horizontally-curved vertical surface (114) which faces said front end surface (86) and an opposing inclined planar surface (116) which faces said rear end surface (88).

2. The snow vehicle of claim 1, and further comprising a first laterally extending foot-positioning rib (120) positioned intermediate said first laterally extending wall member (110) and said front end surface (86) to provide a first operator foot stop.

3. The snow vehicle of claim 2 wherein said first foot-positioning rib (120) has a horizontally-curved vertical foot-engaging surface (124) which faces said first laterally extending wall member (110) and an opposing inclined planar surface (126) which faces said front end surface (86).

4. The snow vehicle of claim 3, and further comprising a second laterally extending foot-positioning rib (130) positioned intermediate said first laterally extending foot positioning rib (120) and said front end surface (86) to provide a second operator foot stop.

5. The snow vehicle of claim 4 wherein said second foot-positioning rib (130) has a horizontally-curved vertical foot-engaging surface (134) which faces said first laterally extending foot-positioning rib (120) and an opposing inclined planar surface (136) which faces said front end surface (86).

* * * * *